United States Patent [19]

Lunghofer et al.

[11] 4,440,866

[45] Apr. 3, 1984

[54] PROCESS FOR THE PRODUCTION OF SINTERED BAUXITE SPHERES

[75] Inventors: Eugene P. Lunghofer, Youngstown, N.Y.; Sten Mortensen; Aubrey P. Ward, both of Columbia, Md.

[73] Assignee: A/S Niro Atomizer, Soeborg, Denmark

[21] Appl. No.: 437,321

[22] Filed: Oct. 28, 1982

Related U.S. Application Data

[63] Continuation-in-part of Ser. No. 278,356, Jun. 29, 1981, abandoned.

[30] Foreign Application Priority Data

Jul. 7, 1980 [GB] United Kingdom ................. 8022175
Jul. 1, 1982 [DK] Denmark ................. 36/82

[51] Int. Cl.³ ............................................. C04B 35/16
[52] U.S. Cl. ........................................ 501/127; 264/6; 264/13; 264/37; 264/56; 264/117; 264/DIG. 51
[58] Field of Search ................. 264/6, 13, 37, 56, 117, 264/DIG. 51; 501/127

[56] References Cited

U.S. PATENT DOCUMENTS

| | | | |
|---|---|---|---|
| 3,486,706 | 12/1969 | Weyland | 264/56 |
| 3,856,441 | 12/1974 | Suzukawa et al. | 425/7 |
| 4,051,603 | 10/1977 | Kern, Jr. | 34/37 |
| 4,052,794 | 10/1977 | Ganiaris | 34/12 |
| 4,104,342 | 8/1978 | Wessel et al. | 264/37 |
| 4,268,311 | 5/1981 | VerDow | 264/56 |
| 4,296,051 | 10/1981 | Shimamura et al. | 264/DIG. 51 |
| 4,343,751 | 7/1982 | Kumar | 264/37 |
| 4,371,481 | 2/1983 | Pollock | 264/15 |

FOREIGN PATENT DOCUMENTS

| | | |
|---|---|---|
| 137042 | 1/1978 | Denmark . |
| 2921336 | 12/1979 | Fed. Rep. of Germany . |
| 1483696 | 6/1967 | France . |
| 715354 | 9/1954 | United Kingdom . |
| 992237 | 5/1965 | United Kingdom . |
| 1033143 | 6/1966 | United Kingdom . |
| 1421531 | 1/1976 | United Kingdom . |
| 2037727A | 7/1980 | United Kingdom . |

OTHER PUBLICATIONS

*Chemical Abstracts*, vol. 85, No. 24, Dec. 13, 1976.

*Primary Examiner*—James R. Hall
*Attorney, Agent, or Firm*—Banner, Birch, McKie and Beckett

[57] ABSTRACT

A process for producing high strength sintered bauxite spheres usable as fracture propping agents in oil or gas wells are produced by continuous spray-granulation of an aqueous binder-containing aluminous ore suspension to form granules which are subsequently sintered. Suitable starting materials include ores of high aluminum silicate content.

9 Claims, 1 Drawing Figure

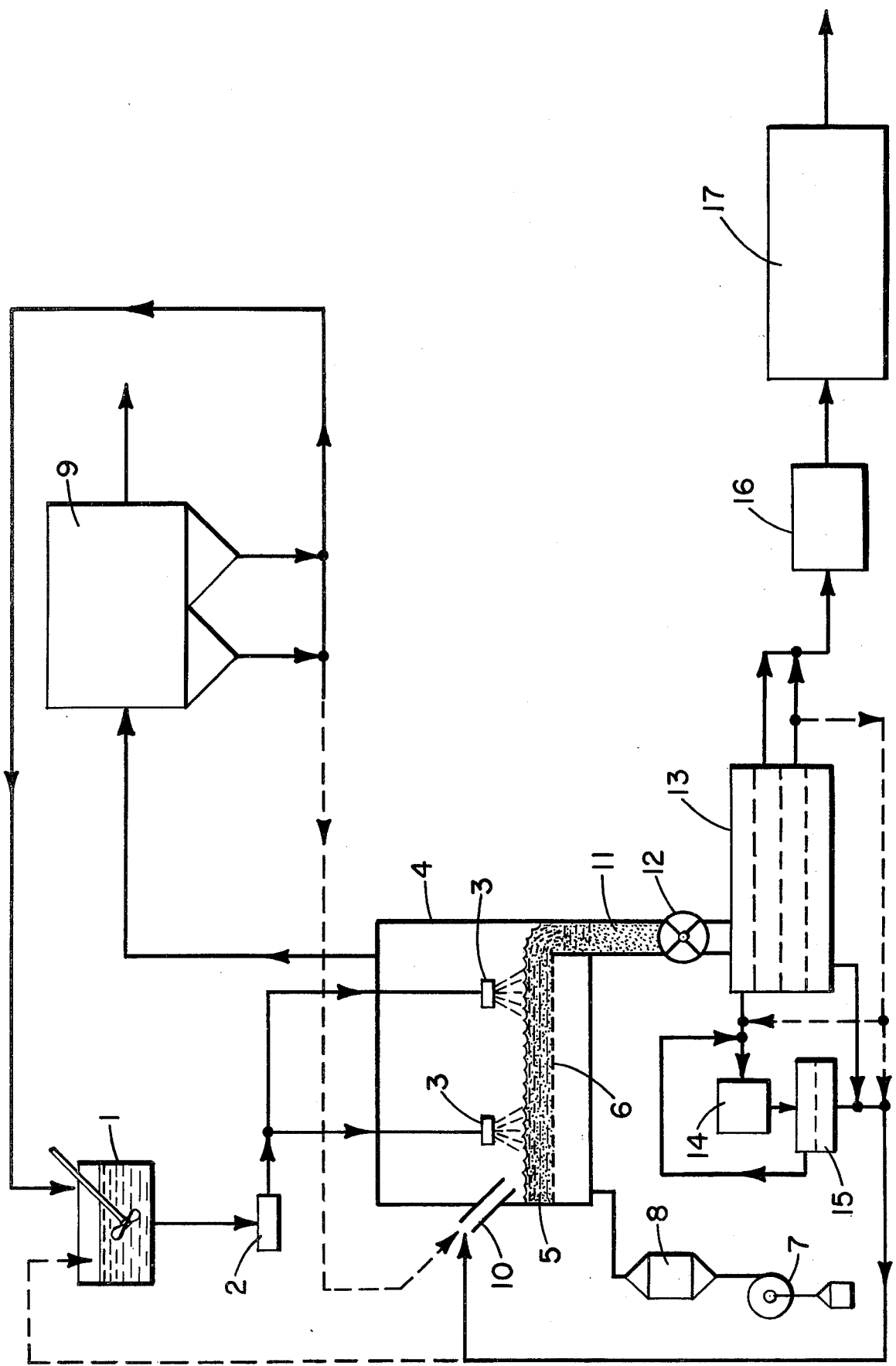

PROCESS FOR THE PRODUCTION OF SINTERED BAUXITE SPHERES

This application is a Continuation-in-Part of U.S. Ser. No. 278,356, filed June 29, 1981, of Eugene Paul Lunghofer, Sten Mortensen, and Aubrey Preston Ward entitled "A Process For The Production Of Sintered Bauxite Spheres", now abandoned.

BACKGROUND OF THE INVENTION

It is well known that the productivity of an oil or gas well may often be increased by a procedure which involves creating a fracture in the subterranean formations surrounding a well and propping the fracture opening by filling it with granular material called propping agent. Methods of this type are disclosed in U.S. Pat. Nos. 3,701,383 and 4,068,718.

A survey of propping agents and their manufacture is given in the specification to U.S. patent application Ser. No. 914,647 filed the Dec. 6, 1978 now abandoned.

A granular material must fulfill several conditions to be suitable for use as a propping agent. The material must have high strength to avoid crushing of the particles when exposed to high pressure during their application. The shape of the individual particle should depart as little as possible from the spherical one and the particle size distribution should be within defined, relative narrow limits to insure sufficient gas and oil permeability of fractures propped with the propping agent. Moreover, the particles should be able to resist the corrosive conditions to which they may be exposed at their application.

The material regarded as most suitable for fulfilling these conditions is sintered bauxite pellets.

Several methods have been proposed for producing sintered bauxite particles. The process which has hitherto found widest commercial success is the one described in the above U.S. application Ser. No. 914,647.

According to said methods bauxite spheres are first prepared by agglomeration of a mixture of bauxite, temporary binder and water in an intensive mixer to produce spheres called green pellets, which are afterwards sintered by heating. In the embodiment examples of said application the products have a typical density of 3.7 g/cm$^3$, while the crushing loss measured by the method described below was 8.16% and 6.8% respectively.

It is however, a drawback of said process that the granulation, which is carried out in an intensive mixer, can only be performed batchwise. Moreover, said prior art process usually requires a preliminary drying of the starting material.

SUMMARY OF THE INVENTION

It is, however, generally recognized that usually a continuous process is to be preferred to a batch-wise process when a large-scale industrial production is concerned.

It is therefore an object of the invention to provide a process for the production of sintered bauxite spheres comprising steps all of which may be performed continuously.

Since any crushing of the bauxite spheres by their use as fracture propping agents involves an impaired permeability of the propped fracture it is desired to obtain a strength of spheres corresponding to a crushing loss even lower that the results obtained according to said U.S. application Ser. No. 914,647.

Consequently it is an other object of the invention to provide a process resulting in bauxite spheres having a crushing loss measured by the below defined method of less than 5%.

In the above prior art process using an intensive mixer the possibilities are rather limited for controlling the granulometry of the product, e.g. because a certain minimum mixing intensity will always be necessary to secure homogeneity of the individual particles. This means that a product having a very narrow particle size distribution, as is often required for propping agents, can only be prepared by simultaneous production of a substantial amount of particles being too small or too large, which necessitates extensive sieving operations and impairs total process economy.

Therefore it is a further object of the invention to provide a process which may easily be adapted to produce a major fraction of particles complying to varying requirements as to particle size distribution.

The above objects are according to the invention achieved by a process for the production of sintered bauxite spheres suitable for use as fracture propping agent in oil wells, which process comprises the steps of
 (a) preparing an aqueous feed suspension comprising bauxite and a binder,
 (b) continuously atomizing said feed suspension into a layer of already partly dried bauxite particles fluidized in a stream of drying air,
 (c) continuously recovering particles from said layer
 (d) continuously separating said recovered particles in oversize, undersize and product fractions, making allowance for shrinkage in the subsequent sintering operation,
 (e) continuously recycling material selected from the group consisting of undersize fractions, relative fine product fractions, ground product fractions and ground oversize fractions, to the layer of fluidized particles at a site at substantial distance, measured along the flow path of the particles, from the site where said recovering of particles takes place, and
 (f) drying and sintering the non-recycled product fractions by heating them at a temperature between 1200° and 1650° C.

A method involving steps in principle corresponding to the above steps (b)–(e) is called fluidized spray granulation and has been suggested for the granulation of various inorganic and organic products. Spray granulation has, however, not been suggested for the manufacture of green proppant pellets and the suitability of the method for this specific purpose could in no way be predicted. In fact it is rather surprising that a perfect spherical shape of the pellets can be obtained, considering the very rapid evaporation of the atomized suspension in the process.

The crushing strength of the resulting sintered particles is to a substantial extent dependent on the homogenity of the green proppant pellets, and it is also rather surprising that a spray granulation process is able to produce pellets which are superior also in that respect.

In the present specification and in the accompanying claims "bauxite" is used in the widest sense of the word comprising also very low grade materials.

It is a special feature of the invention that also aluminous ores may be used which, along with hydrated alumina, contain widely varying amounts of kaolinitic materials such as aluminum silicate and the impurities generally occuring with it. These materials are described, i.a. in Encyclopedia of the Geologic Sciences, McGraw-Hill (1978) and Glossary of Geology, American Geological Institute (1972). In the present specification and in the attached claims the word bauxite is intended as comprising also such ores. Even materials which (after ignition at 800° C.) show an analysis of only 50–60% by weight or even less $Al_2O_3$ with the balance being $SiO_2$ and incidental impurities produce proppants having a crushing strength sufficient for several applications. Said silicate-containing aluminous ores are very inexpensive starting materials and have not previously been regarded as suitable for proppant manufacture.

Said silicate containing materials are especially suitable for use in the present process since dispersions hereof for use as feed in the spray granulation process, may be produced easily by using low energy wet methods such as ball milling or other agitation means, possibly combined with screening operations. Ball milling for 30 minutes or less reduce 98% of the material to less than 10 microns.

All steps of the process of the invention may be carried out in a continuous manner, which makes the process especially attractive for large scale proppant manufacture. It is a further advantage of the process that the preliminary drying necessary in prior art methods is disposed of.

By using the steps (a)–(e) it is possible to obtain pellets of spherical shape and of sufficient strength for handling prior to and during the final drying and sintering process. When a high grade bauxite is used these pellets after sintering form propping agents of higher strength than described in the prior art. When a lower grade bauxite is employed, as in Example 3 below, proppant particles of high crush strengths but of lower densities may be obtained. Such high strength but lower density materials are advantageous in many applications and are less costly to produce. Use of such aluminous ores is specifically illustrated in Example 3. Further disclosure relating to such ores may be found in Lunghofer application Ser. No. 437,206 filed Oct. 28, 1982.

DESCRIPTION OF THE DRAWING

The invention is further elucidated with reference to the drawing, which is a schematic flow sheet illustrating an embodiment of the process.

DESCRIPTION OF THE INVENTION

On the drawing a feed tank is designated 1. In this tank an aqueous feed suspension comprising bauxite and a binder is prepared. Preferably the feed contains 40–60, more preferably approximately 50, % by weight bauxite (as defined above) and preferably 0.25–5, more preferably 0.5–2.5, % by weight binder. The bauxite should preferably have a particle size below 20 micron which is conveniently achieved by a wet grinding process which is less energy consuming than dry milling prescribed in connection with some of the prior art processes. The preferred binders are polyvinyl acetate, polyvinyl alcohol, methylcellulose, dextrin and molasses.

The function of the binder is to provide green strength to the pellets until the sintering thereof. During the sintering most of the binders coming into consideration will decompose. This means that a relatively high amount of binder will impair the strength of the final sintered product, for which reason binders are preferred which exhibit a sufficient temporary binding ability even when used in small amounts.

Also further auxiliary agents may be added to the feed, such as dispersing agents, e.g. polyelectrolytes such as "Darvan c", tetra sodium pyrophosphate, tetra potassium pyrophosphate, polyphosphate, ammonium citrate, or ferric ammonium citrate. With all of these the pH is adjusted to ensure complete deflocculation.

From the tank 1 the feed is led to a pump 2 feeding atomizing nozzles 3 arranged in a fluidized bed unit 4.

Between the feed tank 1 and the nozzles 3 may be inserted a grinding mill and/or sieve (not shown), to prevent that too coarse particles reach the nozzles and the fluid bed.

The atomizing nozzles 3 are pressure nozzles of conventional design, or two-fluid nozzles. The design of such nozzles is well known e.g. from K. Masters: "Spray Drying Handbook", John Wiley and Sons, New York (1979).

The fluid bed unit 4 is of conventional design as described in e.g. U.S. Pat. No. 3,533,829 and in British Pat. No. 1,401,303.

In the illustrated embodiment a fluidized particle layer 5 is supported by a perforated plate 6 through which hot fluidizing gas is flowing. Said hot gas is introduced in the bottom part of the fluid bed unit by means of a fan 7 and an air heater 8.

The distance from the atomizing nozzles 3 to the perforated plate 6 is adjustable and the nozzles are preferably positioned a rather short distance above the surface of the fluidized particle layer 5. The exact position of the nozzles will in each individual case be fixed with due regard to the fact that too long distance from the nozzles to the surface of the fluidized layer causes undesired dust formation, because the atomized feed droplets will be dried to too high an extent, before they reach the fluidized layer, while a too short distance on the other hand results in formation of irregular and too coarse particles. Therefore, the position of the nozzles is adjusted on the basis of analysis of powder taken out from the fluid bed unit.

The velocity of the fluidizing and drying air passing the layer 5 is preferably 0.9–1.5 m/sec. and the height of the fluidized particle layer will typically be 20–60 cm.

The temperature of the drying- and fluidizing air when introduced at the bottom part of the fluidized bed unit 4 will preferably be 250–650° C. more preferably 400–600° C.

When leaving the fluid bed unit the temperature of said air is preferably below 100° C., more preferably approximately 70° C.

From the fluid bed unit the air entraining dust consisting primarily of fine bauxite particles are led to a collector means 9, which may for instance be an electrostatic precipitator, a cyclone, a bag filter or a wet scrubber or a combination thereof.

Particles recovered in the collector means 9 may be recycled to the feed tank 1 and/or to the fluidized bed unit 4. It has turned out that the fine particles collected in 9 are very suitable for being recycled as seed particles to the fluidized bed due to their uniform spheroidal shape, and in this respect they are superior to other seed particles obtained by grinding as explained below.

It is essential that the fluid bed unit 4 is designed to give a long and uniform residence time for the particles to obtain a desired particle size distribution and the desired spherical shape of the product. Therefore, the flow of particles in the fluidized layer should be of the type conventionally termed plug flow, which is a flow pattern wherein very little back mixing takes place. Thereby an equal treatment of all particles is secured.

In a fluidized particle layer, plug flow of the particles may be obtained by various measures. In the embodiment shown on the drawing the desired flow pattern is obtained by introducing powder particles serving as seeds or nuclei through a powder inlet 10 in one end of the fluid bed unit 4 and removing particles from the fluidized layer 5 through an outlet 11 situated at the opposite end of the fluid bed unit. Alternatively plug flow may be obtained by using guide walls in the fluid bed as is well known in the art.

The seed or nuclei particles introduced through powder inlet 10 consist of recycled material as will be explained above and further elucidated below.

Alternatively to the illustrated embodiment the fluid bed unit may comprise two or several compartments in which different conditions prevail as to fluidizing air velocity, temperature and slurry feeding conditions. Such fluid bed units having more than one compartment are well known in the art, and may e.g. have a circular perforated plate and radian partitions preventing back mixing.

Through the powder outlet 11 is withdrawn a powder having a moisture content of 1-5% which powder via a rotary valve 12 is conducted to a sieving unit 13 wherein it is separated into three or more fractions, viz. an oversize fraction, one or more product fractions (in the embodiment shown: two fractions) and an undersize fraction.

The oversize fraction is conducted to a grinding unit comprising a mill 14 and a sieve 15 which may possibly be combined. Oversize material are recycled from the sieve 15 to the mill 14 and fractions having preferably a size of approximately 0.5 mm are, in the embodiment shown, led to the powder inlet 10 of the fluid bed unit together with the fine fraction. In case the quantity of material of these two fractions, together with material collected in 9, is not sufficient to form seed of nuclei material for the fluid bed, a part of the product fraction or of one of the product fractions may be added thereto as indicated by the dotted line in the lower part of the drawing. A part of or the total amount of recycled product fraction may be ground before being introduced to the fluid bed, as indicated on the drawing. On the other hand, if the amount of material in the oversize fraction together with the undersize fraction is higher than what is required to supplement seed or nuclei material, a part thereof may be added to the feed tank 1, as illustrated by the dotted line in the left upperpart of the drawing.

Non-recycled product fraction or fractions are led to a drying oven 16 wherein residual moisture and organic additives are evaporated and thereafter to a kiln 17, e.g. a rotary kiln, wherein the particles are sintered to form high strength spheres suitable as propping agents. The firing process taking place in the kiln 17 is conducted under the same conditions as those used in the prior art processes in which an agglomeration has been performed in a mixing apparatus.

The size limits for the product fractions separated in the sieving unit 13 must be fixed with due regard to the fact that in the subsequent firing process in the kiln 17 a substantial shrinkage takes place. The extent of this shrinkage depends on the origin of the original bauxite and may typically amount to approximately 25% on linear basis.

As it appears the process may be performed on a continuous basis and it is very suitable for being automatically controlled using a minimum of manpower.

As mentioned above the resulting propping agent has, when usual higher grade bauxite is used, higher density and higher crushing strength than obtained in the embodiment examples of the above mentioned U.S. application. The crushing strength is evaluated by a method in which the fraction between approximately 600 microns and approximately 700 microns is placed in a 1⅜ inch diameter steel cylinder, and pressure is applied to the sample through a plunger fitting the top of the cylinder according to the following schedule: 1 minute to 700 kg/cm², 3 minutes hold at this pressure and 1 minute down to 0 pressure. Afterwards the amount of material having a particle size below 600 microns is measured and expressed as % of the total amount. The result is recorded as the weight % crushing loss.

The invention is further elucidated by means of the following embodiment example.

EXAMPLE 1

The process is carried out in a plant corresponding to the one illustrated on the drawing.

In the feed tank a feed suspension is prepared from water, fresh bauxite, recycled bauxite dust from the collector unit and the below indicated auxiliary agents in amounts giving a total solids content of the feed suspensions of approximately 50% by weight which solids consist of ca. 98% bauxite, 1% polyvinylalkohol and 0.3% ammonium citrate. This feed is in an amount of 4000 kg/hour atomized through the pressure nozzles 3 in a fluid bed unit in principle designed as shown on the drawing and having a fluidizing area of 3 m².

The velocity of the fluidizing air is 1.2 m/sec. and the inlet temperature of the air is 550° C. while the outlet temperature is 70° C. Recycled material introduced through the powder inlet 10 amounts to 1700 kg/hour. The height of the fluidized particle layer 5 is approximately 35 cm.

The average residence time of the particles in the fluidized layer may under these conditions be estimated to 15 minutes.

Through the outlet 11 material is withdrawn in a quantity of 3400 kg/hour, which by sieving is separated in an oversize fraction having a particle size above 2.1 mm (50 kg/hour), a coarse product fraction having a particle size between 1.2 and 2.1 mm (300 kg/hour), a fine product fraction having a particle size between 0.6 and 1.2 mm (2450 kg/hour) and an undersize fraction having a particle size below 0.6 mm (600 kg/hour).

In the collector unit 9 which is a bag filter 300 kg/hour entrained particles are collected and recycled to the feed tank 1.

The total amount of the oversize fraction together with 400 kg/hour of the fine product fraction is ground in a grinding unit having a sieve of mesh size 3000 microns, and together with the undersize fraction led to the fluid bed unit as seed or nuclei particles. 650 kg/hours fine product fraction is recycled to inlet 10 without prior grinding.

The remaining material from the product fractions is led through an oven in which the remaining moisture and organic additions (approximately totally 4% by weight) are removed and afterwards the sintering is performed in a rotary kiln at a temperature of approximately 1500° C. The residence time of the particles at this temperature is approximately 10 minutes.

The sintered particles is subject to a further sieving operation to assure that substantially all the product has a particle size between 0.4 and 1.5 mm. The sphericity of the particles is excellent and their density approximately 3.8 g/cm³. The crushing strength according to the above method is 1.5% by weight, for which reason the product must be regarded a being excellently suitable as a propping agent.

EXAMPLE 2

In this embodiment the process is performed in a plant which only departs from the one used in Example 1 by having a sieving unit 13 which separates the particles in only three fractions (viz. an oversize fraction, a product fraction and an undersize fraction) and by having a collector means 9 comprising a cyclone collecting particles coarser than approximately 100 microns and a wet scrubber collecting the finer particles as an aqueous slurry.

Also in this embodiment the total solids content of the feed suspension is approximately 50% by weight and the quantity atomized is 4000 kg/hour.

Inlet air temperature is 530° C. and the outlet air temperature 68° C.

That part of the material recycled as seed to the powder inlet 10 which consists of the undersize fraction, the ground oversize fraction and a part of the product fraction (ground) amounts to 300 kg/hour.

As in Example 1 the fluidizing air velocity is 1.2 m/sec. and the height of the fluidized layer is approximately 35 cm. The average residence time is approximately 20 minutes.

The material withdrawn from the fluid bed through 11 amounts to approximately 2100 kg/hour and is let to the sieving unit 13 having two screens of mesh width 1.5 and 0.6 mm. respectively. Thereby is obtained 30 kg/hour oversize fraction, 2030 kg/hour product fraction and 40 kg/hour undersize fraction.

230 kg/hour of the product fraction is together with the oversize fraction ground to a particle size less than 600 microns and recycled together with the undersize fraction as mentioned above.

In the above mentioned cyclone 100 kg/hours particles having a size above 100 microns are collected and recycled to fluid bed inlet 10, while in the wet scrubber connected to the cyclone 200 kg/hour particles of an average size below 100 microns are collected and recycled as a slurry to the feed tank 1.

The product fraction not recycled which amounts to 1800 kg/hour is dryed and sintered as described in Example 1. The crushing strength is 1.7% by weight and the density approximately 3.8 g/cm³.

EXAMPLE 3

The starting material in this Example was an aluminous ore from Eufaula, Alabama, USA, showing the following analysis (after ignition at 800° C.): $Al_2O_3$ 50,7% by weight, $SiO_2$ 45,8% by weight, $TiO_2$ 2,60% by weight, $Fe_2O_3$ 0,71% by weight, the remainder being alkali and alkali earth metal oxides. An aqueous dispersion of the material as mined was prepared using ball milling or mechanical agitation and addition of 0.25% "Darvan c" or 0.2% sodium pyrophosphate. Water was added to a solids content of 45%. The pH was adjusted with NaOH to above 8 to insure complete deflocculation and low viscosity. 0.75% "Gelvator" 20/30 was added as temporary binder. This process was performed as described in Example 1 wherein green proppants were obtained having a sphericity of 0.9 (Krumheim and Sloss, 1955). By sintering at 1500° C. proppants were obtained having a crushing strength according to the above method of 6.5%. (This example appears as Example 11 in application Ser. No. 437,206 of Eugene P. Lunghofer filed concurrently herewith on Oct. 28, 1982, for, Hydraulic Fracturing Propping Agent.)

What is claimed is:

1. A process for the production of sintered bauxite spheres, suitable for use as fracture propping agent in oil wells, comprising the steps of
   (a) preparing an aqueous feed suspension comprising bauxite and a binder,
   (b) continuously atomizing said feed suspension into a layer of already partly dried bauxite particles fluidized in a stream of drying air,
   (c) continuously recovering particles from said layer
   (d) continuously separating said recovered particles in oversize, undersize and product fractions making allowance for shrinkage in the subsequent sintered operation,
   (e) continuously recycling material selected from the group consisting of undersize fractions, relative fine product fractions, ground product fractions and ground oversize fractions, to the layer of fluidized particles at a site at substantial distance, measured along the flow path of the particles, from the site where said recovering of particles takes place, and
   (f) drying and sintering the non-recycled product fractions by heating them at a temperature between 1200° and 1650° C.

2. A process according to claim 1, wherein the aqueous feed suspension contains 40–60% by weight bauxite having a particle size below 20 micron and 0.25–5% by weight binder selected from the group consisting of polyvinyl alcohol, polyvinyl acetate, methyl cellulose, dextrine and molasses.

3. A process according to claim 1, wherein the material recycled in step (e) has been ground to a controlled particle size distribution.

4. A process according to claim 1, wherein the stream of drying air fluidizing the bauxite particles has a velocity of 0.5–1.5 m/s.

5. Sintered bauxite spheres produced by a process according to claim 1 and having less than 5% by weight crushing loss, measured as defined herein.

6. A process for the production of binder-containing bauxite spheres for use in the manufacture of sintered bauxite spheres comprising
   (a) preparing an aqueous feed suspension comprising bauxite and a binder,
   (b) continuously atomizing said feed suspension into a layer of already partly dried bauxite particles fluidized in a stream of drying air,
   (c) continuously recovering particles from said layer,
   (d) continuously separating said recovered particles in oversize, undersize and product fractions, and
   (e) continuously recycling material selected from the group consisting of undersize fractions, relative fine product fractions, ground product fractions and ground oversize fractions, to the layer of fluidized particles at a site at substantial distance, measured along the flow path of the particles, from the site where said recovering of particles takes place.

7. Binder-containing bauxite spheres produced by a process according to claim 6.

8. A process according to claim 1-4 or 6 wherein the starting material is an aluminous ore comprising, along with hydrated alumina, a predominant amount of aluminium silicates and impurities occurring therewith in nature.

9. A process according to claim 8 wherein the aluminous ore contains aluminum compounds in an amount corresponding to 45-60% $Al_2O_3$ (analyzed after ignition at 800° C.).

* * * * *

UNITED STATES PATENT AND TRADEMARK OFFICE
CERTIFICATE OF CORRECTION

PATENT NO. : 4,440,866
DATED : April 3, 1984
INVENTOR(S) : Eugene P. Lunghofer, Sten Mortensen and Aubrey P. Ward It is certified that error appears in the above—identified patent and that said Letters Patent is hereby corrected as shown below:

First page, Column 1, Assignee should read -- A/S Niro Atomizer, Soeborg, Denmark, and Dresser Industries, Inc., Dallas, Texas --

Signed and Sealed this

Thirty-first Day of July 1984

[SEAL]

Attest:

GERALD J. MOSSINGHOFF

Attesting Officer

Commissioner of Patents and Trademarks